United States Patent
Moon et al.

(10) Patent No.: US 10,404,066 B2
(45) Date of Patent: Sep. 3, 2019

(54) CONGESTION MANAGEMENT SYSTEM AND POWER-SYSTEM MANAGEMENT SYSTEM FOR RELIEVING OVERLOAD OF TRANSMISSION LINE

(71) Applicant: EN Technologies Inc., Gunpo-Si (KR)

(72) Inventors: Young Doug Moon, Seongnam-si (KR); Wan Kyun Ham, Daejeon (KR); Tay Seek Lee, Seoul (KR)

(73) Assignee: EN Technologies Inc. (KR)

( * ) Notice: Subject to any disclaimer, the term of this patent is extended or adjusted under 35 U.S.C. 154(b) by 0 days.

(21) Appl. No.: 15/789,434

(22) Filed: Oct. 20, 2017

(65) Prior Publication Data

US 2018/0138706 A1    May 17, 2018

(30) Foreign Application Priority Data

| Nov. 16, 2016 | (KR) | 10-2016-0152532 |
| Nov. 16, 2016 | (KR) | 10-2016-0152543 |
| Nov. 16, 2016 | (KR) | 10-2016-0152546 |
| Nov. 16, 2016 | (KR) | 10-2016-0152549 |

(51) Int. Cl.
  *H02J 3/12* (2006.01)
  *G05B 15/02* (2006.01)
  *H02J 13/00* (2006.01)
  *H02J 3/32* (2006.01)

(52) U.S. Cl.
  CPC .............. *H02J 3/12* (2013.01); *G05B 15/02* (2013.01); *H02J 3/32* (2013.01); *H02J 13/0006* (2013.01); *Y02E 60/722* (2013.01); *Y04S 10/14* (2013.01)

(58) Field of Classification Search
  None
  See application file for complete search history.

(56) References Cited

U.S. PATENT DOCUMENTS

| 2010/0076613 A1* | 3/2010 | Imes | G06Q 50/06 700/287 |
| 2014/0070617 A1* | 3/2014 | Detmers | H02J 7/041 307/64 |
| 2014/0341224 A1* | 11/2014 | Armbruster | H04L 12/42 370/395.53 |
| 2016/0248263 A1* | 8/2016 | Hunt | H02J 5/00 |

FOREIGN PATENT DOCUMENTS

| JP | H08023634 A | 1/1996 |
| JP | 2013-172537 A | 9/2013 |

* cited by examiner

*Primary Examiner* — Ziaul Karim
(74) *Attorney, Agent, or Firm* — Harness, Dickey & Pierce, P.L.C.

(57) ABSTRACT

A power-system management system and a method thereof, which generally manage congestion of a power system by relieving a power transmission line from being overloaded when the power transmission line is overloaded due to a rapid increase in load or the occurrence of credible accidents in the power system. To relieve the overload of the transmission line, the amount of power generated by a generator may be reduced, energy may be supplied from an energy storage device to the transmission line, or those two methods may be used together. There is provided a method of quantitatively calculating the amount of a generator's generated power desired to be reduced and the amount of power to be supplied from the energy storage device to the transmission line, in order to relieve the overload of the transmission line.

5 Claims, 10 Drawing Sheets

CONGESTION MANAGEMENT SYSTEM AND POWER-SYSTEM MANAGEMENT SYSTEM FOR RELIEVING OVERLOAD OF TRANSMISSION LINE

CROSS REFERENCE TO RELATED APPLICATION

This application claims priority from Korean Patent Application Nos. 10-2016-0152532, 10-2016-0152543, 10-2016-0152546 and 10-2016-0152549, all filed on Nov. 16, 2016 which are hereby incorporated by reference for all purposes as if fully set forth herein.

FIELD

Field of the Invention

The present invention relates to a power-system management system and a method thereof, which generally manage congestion of a power system by relieving a transmission line from being overloaded when the transmission line is overloaded due to a rapid increase in load or the occurrence of credible accidents in the power system. Particularly, the present invention relates to a power-system management system and a method thereof, which collect at least one piece of information from among operational setting information from an energy management system (EMS), information associated with a transmission line from a transmission line monitoring device, and battery state information from an energy storage system (ESS), and relieves the transmission line from being overloaded based on the collected information, thereby efficiently and reliably managing the overall power system.

DESCRIPTION OF THE PRIOR ART

The amount of electric power consumed is increasing along with the economic growth. However, when a corresponding power reserve rate is insufficient, a major blackout crisis can occur. To overcome an electric power shortage, there is a need for expansion of a power supply, power demand management, and propagation of new renewable energy in a long term period. Also, there is a need for supplying an energy storage device to equalize an electric load which significantly varies over time, and for managing a power management system using the energy storage device, in order to find out a method of efficiently coping with peak usage of power and a major blackout crisis, or the like.

An energy management system (EMS) generally monitors and controls the power system, and performs functions, such as economic dispatch and automatic generated power control, power system interpretation, recording and storing material data, and dispatcher simulation, and the like. The EMS controls generated output of current national scheduled generators, and generally monitors and controls a driving state of a transmission line greater than or equal to 154 KV, an operation state of system protection facilities, such as a circuit breaker or the like, an abnormal state or a malfunction of a power system, a voltage and frequency, and the like.

In order to smoothly provide power along with an increase in the amount of power consumed, power plants need to be constructed and transmission lines also need to be expanded. However, power plants and transmission lines may be difficult to be constructed in an area around the center of a load. Accordingly, there is high probability of overload and various problems related to stability in association with a massive amount of power transmission at a long-distance, and an overloaded transmission line attributable to an accident may be frequently founded. Therefore, there is a desire for measures for the above drawbacks.

Also, in a power system in which transmission and distribution lines are tangled between a plurality of generators and a plurality of loads, it is difficult to determine a generator which needs to reduce power production and the amount of power to be reduced when a transmission line is overloaded. Also, when an energy storage device is used, it is difficult to determine the amount of power to be provided from the energy storage device in order to reduce power of the overloaded transmission line to the appropriate amount of power. These are drawbacks to be overcome.

SUMMARY OF THE INVENTION

In this background, an aspect of the present invention is to provide a system and method for generally managing congestion of a power system by relieving a transmission line from being overloaded when the transmission line is overloaded due to a rapid increase in load or the occurrence of credible accidents in the power system.

An aspect of the present invention is to provide a method of calculating a generators' production power reduction required to relieve the overload of a transmission line.

An aspect of the present invention is to provide a method of calculating an energy storage device's power supply required to relieve the overload of a transmission line.

In accordance with an aspect of the present invention, there is provided a congestion management system, including: an energy storage device connected with a transmission line, and configured to receive power from the transmission line to store the power, or to supply power to a load associated with the transmission line; and a congestion control power management system configured to: receive information associated with the transmission line from a transmission line monitoring device so as to calculate transmission line power, which is power flowing through the transmission line; determine that the transmission line power is overloaded when the transmission line power is greater than or equal to a set value; and control the energy storage device to provide supply power to the load, wherein the supply power is power calculated based on a desired transmission line power reduction which corresponds to an amount of transmission line power desired to be reduced.

The calculating of the supply power which is to be supplied to the load from the energy storage device, based on the desired transmission line power reduction may include: defining a maximum influential load, which most highly affects the transmission line, calculating a load-transmission line reduction ratio which is a reduction ratio between the maximum influential load and the transmission line power according to Equation 1 provided below, and calculating the supply power using the load-transmission line reduction ratio and the desired transmission line power reduction according to Equation 2 provided below.

$$\text{load-transmission line reduction ratio} = \frac{\text{reduction in transmission line power}}{\text{reduction in maximum influential load}} \quad \text{[Equation 1]}$$

$$\text{supply power} = \frac{\text{desired transmission line power reduction}}{\text{load-transmission line reduction ratio}} \quad \text{[Equation 2]}$$

The energy storage device may include a plurality of energy storage devices which use various protocols, and the congestion management system may further include a network matching device which communicates with a plurality of energy storage devices which use various protocols, standardizes information collected from the plurality of energy storage devices, and provides the standardized information to the congestion control power management system.

The network matching device may communicate with the congestion control power management system and the energy storage device based on a parallel redundancy protocol (PRP) scheme.

The network matching device may gather the information collected from the plurality of energy storage devices, may convert the information based on the same address space (address map) and a predetermined scale, and may provide the converted information to the congestion control power management system.

The congestion control power management system may include: a communication duplex device configured to communicate with the network matching device; a data storage device configured to store data; and a congestion control operation-processing device configured to calculate the transmission line power and the supply power.

The energy storage device may include: a communication duplex device configured to communicate with the network matching device; a battery configured to store energy; and a power converting device configured to convert and transmit energy between the transmission line and the battery.

In accordance with another aspect of the present invention, there is provided a power-system management system, including: a congestion management system according to above-described invention; a transmission line monitoring device configured to monitor the state of a transmission line to provide monitor information to the congestion management system; and an energy management system configured to receive information associated with supply power from the congestion management system, and controls the amount of power generated by a generator associated with the transmission line.

In accordance with another aspect of the present invention, there is provided a method of managing the overload of a transmission line by a congestion management system including an energy storage device, the method including: a first operation of receiving information associated with the transmission line from a transmission line monitoring device; a second operation of calculating transmission line power which is power flowing through the transmission line; a third operation of determining that the transmission line power is overloaded when the transmission line power is greater than or equal to a set value, and calculating supply power, which is power to be supplied to a load associated with the transmission line, based on a desired transmission line power reduction corresponding to the amount of transmission line power desired to be reduced; and a fourth operation of controlling the energy storage device to supply the supply power having been calculated to the load.

The third operation of calculating the supply power based on the desired transmission line power reduction may include: defining a maximum influential load, which most highly affects the transmission line; calculating a load-transmission line reduction ratio which is a reduction ratio between the maximum influential load and the transmission line power according to Equation 1 provided below; and calculating the supply power using the load-transmission line reduction ratio and the desired transmission line power reduction according to Equation 2 provided below.

$$\text{load-transmission line reduction ratio} = \frac{\text{reduction in transmission line power}}{\text{reduction in maximum influential load}} \quad \text{[Equation 1]}$$

$$\text{supply power} = \frac{\text{desired transmission line power reduction}}{\text{load-transmission line reduction ratio}} \quad \text{[Equation 2]}$$

The congestion management system may include: a plurality of energy storage devices connected with a transmission line, and configured to receive power from the transmission line to store the same, or to supply power to the load; and a congestion control power management system configured to: calculate the supply power; and control the energy storage device to provide the supply power to the load.

The congestion management system may further include a network matching device configured to: communicate with the plurality of energy storage devices which use various protocols, standardize information collected from the plurality of energy storage devices, and provide the information to the congestion control power management system.

The network matching device may communicate with the congestion control power management system and the energy storage device based on a parallel redundancy protocol (PRP) scheme.

The congestion control power management system may include: a communication duplex device configured to communicate with the network matching device; a data storage device configured to store data; and a congestion control operation-processing device configured to calculate the transmission line power and the supply power.

The energy storage device may include: a communication duplex device configured to communicate with the network matching device; a battery configured to store energy; and a power converting device configured to convert and transmit energy between the transmission line and the battery.

In accordance with an another aspect of the present invention, there is provided a power-system management system, including: a congestion management system configured to receive information associated with a transmission line from a transmission line monitoring device, and to provide information associated with transmission line power that flows through the transmission line to an energy management system; and the energy management system configured to perform control to reduce power production of a generator associated with the transmission line by an amount of cutback power having been calculated according to a desired transmission line power reduction A, which corresponds to an amount of power desired to be reduced in the transmission line when the transmission line is overloaded.

Calculating the amount of cutback power based on the desired transmission line power reduction A may include: defining a maximum influential generator which most highly affects the transmission line; calculating a generator-transmission line reduction ratio between the maximum influential generator and the transmission line according to Equation 3 provided below; and calculating the amount of cutback power using the generator-transmission line reduction ratio and the desired transmission line power reduction A according to Equation 4 provided below.

$$\text{generator-transmission line reduction ratio} = \frac{\text{reduction in transmission line power}}{\text{reduction in generator's generated power}} \quad \text{[Equation 3]}$$

$$\text{cutback power} = \frac{\text{desired transmission line power reduction } A}{\text{generator-transmission line reduction ratio}} \quad \text{[Equation 4]}$$

The desired transmission line power reduction A may be equal to excess power which corresponds to the difference between the transmission line power and an appropriate power set value.

Calculating the cutback power may be performed by the energy management system.

The congestion management system may calculate the transmission line power, determine whether the transmission line power is overloaded, calculate the cutback power, and provide the information to the energy management system.

The congestion management system may include: an energy storage device connected to the transmission line, and configured to receive power from the transmission line so as to store the power, or to supply power to a load associated with the transmission line; and a congestion control power management system configured to: calculate the transmission line power by receiving information associated with the transmission line from the transmission line monitoring device; determine that the transmission line power is overloaded when the transmission line power is greater than or equal to a set value; and control the energy storage device to provide supply power to the load, wherein the supply power is calculated based on a desired transmission line power reduction B.

Calculating the supply power to be supplied to the load from the energy storage device, based on the desired transmission line power reduction B may include: defining a maximum influential load which most highly affects the transmission line; calculating a load-transmission line reduction ratio between the maximum influential load and the transmission line power according to Equation 1 provided below; and calculating the supply power using the load-transmission line reduction ratio and the desired transmission line power reduction B.

$$\text{load-transmission line reduction ratio} = \frac{\text{reduction in transmission line power}}{\text{reduction in maximum influential load}} \quad \text{[Equation 1]}$$

$$\text{supply power} = \frac{\text{desired transmission line power reduction } B}{\text{load-transmission line reduction ratio}} \quad \text{[Equation 2]}$$

The sum of the desired transmission line power reduction A and the desired transmission line power reduction B may be set to excessive power corresponding to the difference between the transmission line power and an appropriate power set value.

In accordance with another aspect of the present invention, there is provided a method of managing a power system by a power-system management system, the method including: a first operation of receiving information associated with a transmission line from a transmission line monitoring device; a second operation of calculating transmission line power which is power flowing through the transmission line; a third operation of determining that the transmission line power is overloaded when the transmission line power is greater than or equal to a set value, calculating a desired transmission line power reduction A which corresponds to the amount of transmission line power desired to be reduced, and calculating cutback power of a generator associated with the transmission line based on the desired transmission line power reduction A; and a fourth operation of performing control to reduce the power production of the generator by the amount of cutback power.

The calculating the amount of cutback power based on the desired transmission line power reduction A may include: defining a maximum influential generator which most highly affects the transmission line; calculating a generator-transmission line reduction ratio between the maximum influential generator and the transmission line according to Equation 3 provided below; and calculating the amount of cutback power using the generator-transmission line reduction ratio and the desired transmission line power reduction A according to Equation 4 provided below.

$$\text{generator-transmission line reduction ratio} = \frac{\text{reduction in transmission line power}}{\text{reduction in generator's generated power}} \quad \text{[Equation 3]}$$

$$\text{cutback power} = \frac{\text{desired transmission line power reduction } A}{\text{generator-transmission line reduction ratio}} \quad \text{[Equation 4]}$$

The third operation may further include: calculating a desired transmission line power reduction B, and calculating supply power which is power to be supplied to a load associated with the transmission line from the energy storage device, based on the desired transmission line power reduction B. The fourth operation may further include: controlling the energy storage device to provide supply power having been calculated to the transmission line.

Calculating the supply power based on the desired transmission line power reduction B may include: defining a maximum influential load which most highly affects the transmission line; calculating a load-transmission line reduction ratio between the maximum influential load and the transmission line power according to Equation 1 provided below; and calculating the supply power using the load-transmission line reduction ratio and the desired transmission line power reduction B.

$$\text{load-transmission line reduction ratio} = \frac{\text{reduction in transmission line power}}{\text{reduction in maximum influential load}} \quad \text{[Equation 1]}$$

$$\text{supply power} = \frac{\text{desired transmission line power reduction } B}{\text{load-transmission line reduction ratio}} \quad \text{[Equation 2]}$$

The sum of the desired transmission line power reduction A and the desired transmission line power reduction B may be set to excessive power corresponding to the difference between the transmission line power and an appropriate power set value.

According to the present invention, when a transmission line is overloaded due to the occurrence of a credible accident or a rapid increase in electric power load, power may be supplied to the load using an energy storage device or the amount of generated power of a generator associated with the overloaded transmission line may be reduced, whereby the overload of the corresponding transmission line may be promptly relieved, the overall power flow of a transmission and distribution line is effectively managed, and a temporary overload is rapidly handled. Accordingly, the needs of constructing additional generation, transmission, and distribution facilities to supply peak power can be reduced, and social and economic costs can be also reduced.

According to the present invention, when a transmission line is overloaded, a reduction ratio between a load that most highly affects the corresponding transmission line and the corresponding transmission line power is used to calculate the amount of power to be supplied to the corresponding load from an energy storage device, whereby the amount of power supplied to the overloaded transmission line in a complicated power system can be promptly controlled to the appropriate amount of power and the overload can be relieved.

According to the present invention, when a transmission line is overloaded, a reduction ratio between power of a generator that most highly affects the corresponding transmission line and the corresponding transmission line power is used to calculate the amount of produced power of the corresponding generator, whereby the amount of power supplied to the overloaded transmission line in a complicated power system can be promptly controlled to the appropriate amount of power and the overload can be relieved.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described with reference to the accompanying drawings. When detailed descriptions related to a well-known related function or configuration are determined to make the spirits of the present invention ambiguous, the detailed descriptions will be omitted herein.

Figure 1:
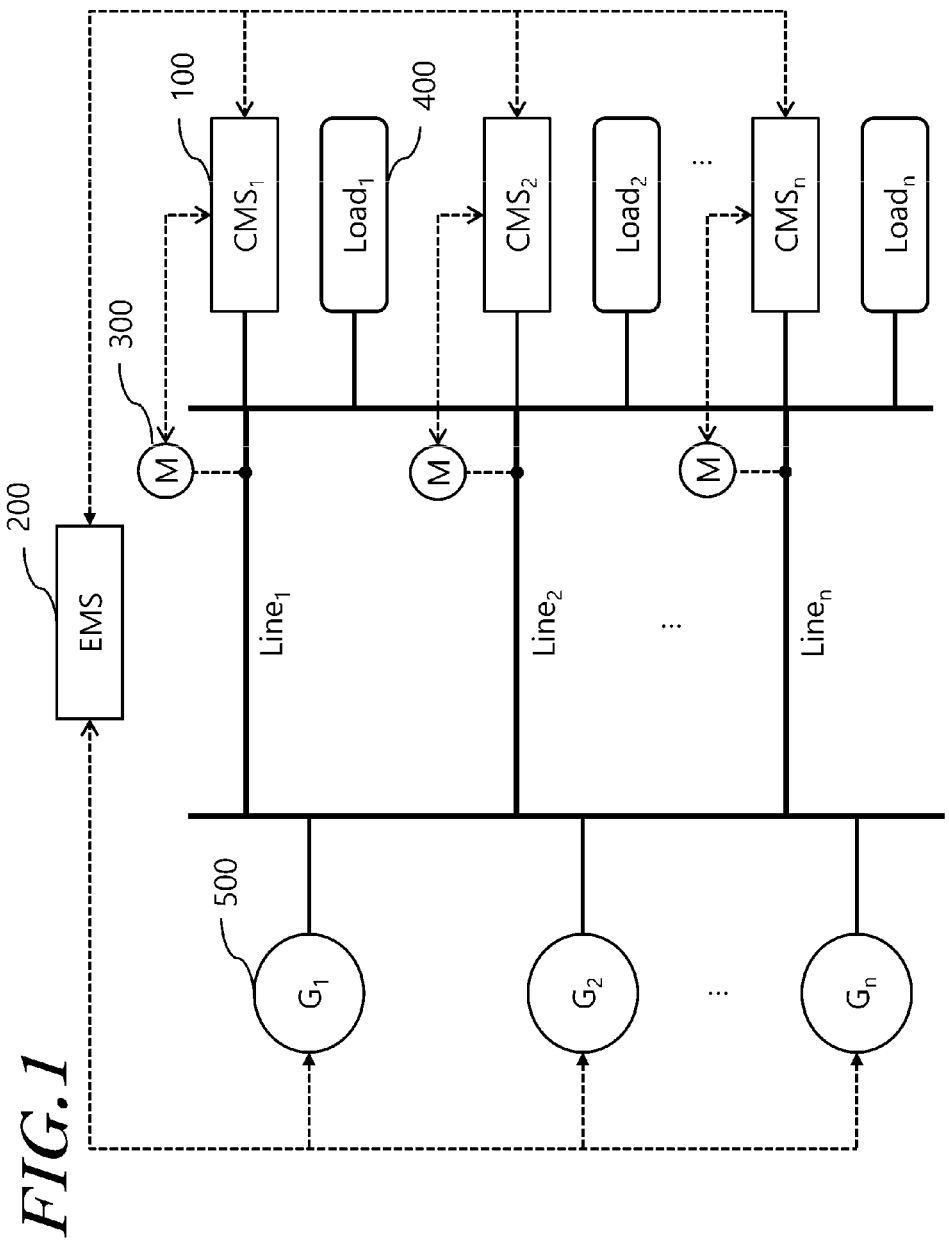
FIG. 1 is a diagram illustrating a power system including a power-system management system according to an embodiment of the present invention.
Figure 2:
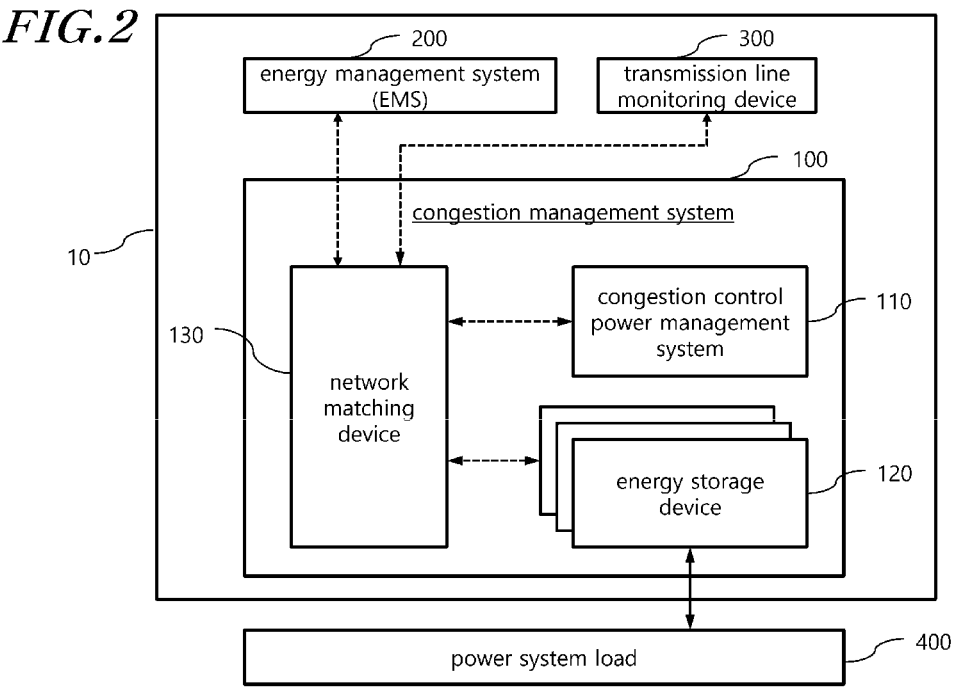
FIG. 2 is a block diagram illustrating a power-system management system according to an embodiment of the present invention.

FIG. 1 is a diagram illustrating a power system including a power-system management system according to an embodiment of the present invention. FIG. 2 is a block diagram illustrating a power-system management system 10 according to an embodiment of the present invention.

Referring to FIGS. 1 and 2, the power-system management system 10 according to an embodiment of the present invention may include a congestion management system (CMS) 100, an energy management system (EMS) 200, and a transmission line monitoring device 300.

The CMS 100 may be connected with the EMS 200 and the transmission line monitoring device 300 through a communication line, so as to transmit and receive information required for managing the power system. The CMS 100 may be connected with a plurality of generators 500 and loads 400 through transmission lines, so as to supply or receive power to/from the transmission lines.

The EMS 200 is a higher management system of the CMS 100, and may be, for example, an EMS existing in a power exchange center. The EMS 200 generally monitors and controls the power system, and may perform functions, such as economic dispatch and automatic generated power control, power system interpretation, recording and storing material data, dispatcher simulation, and the like. The EMS 200 may calculate a generator output target value for each generated resource in association with the generated-output control and frequency monitoring control function, and may perform control using an automatic generation control signal, whereby the electric supply of the overall power system can be managed.

The EMS 200 may receive, from the CMS 100, information associated with power having been supplied to a transmission line from the energy storage device 120 managed by the CMS 100, and may control the amount of power generated by a generator associated with the transmission line. The EMS 200 may be embodied using a computer system such as a server or the like.

The transmission line monitoring device 300 may measure the voltage, the current, the phase, the temperature, and the like of a transmission line using various sensors, such as a potential transformer (PT), a current transformer (CT), a metering outfit (MOF), or the like, and may transmit the measured value to the CMS 100 through a communication line.

When the loads 400 globally exist, and the loads rapidly increase since users temporarily increase the amount of power consumed, the generators 500 may increase the amount of power produced and provide the increased amount of power in order for the balance of electric demand and supply. In this instance, transmission lines associated with the rapidly increased loads 400 may be overloaded.

Referring to FIG. 2, the CMS 100 may include a congestion control power management system 110, one or more energy storage devices 120, and a network matching device 130.

The network matching device 130 may communicate with the congestion control power management system 110, the EMS 200, the transmission line monitoring device 300, the energy storage devices 120, or the like. The network matching device 130 may transmit and receive information required for managing a power system to/from the EMS 200, may collect transmission line information such as voltage, current, power, phase, or the like from the transmission line monitoring device 300, or collect state information associated with a power converting device 122 and a battery 123 from the energy storage device 120 so as to provide the same to the congestion control power management system 110. The network matching device 130 may communicate with a plurality of energy storage devices 120 that use various protocols, may standardize information collected from the plurality of energy storage devices 120, and may store the same or provide the same to the congestion control power management system 110.

The congestion control power management system 110 may calculate the amount of power to be supplied to the energy storage device 120 from a transmission line or the amount of power to be supplied to a transmission line or load from the energy storage device 120 based on the collected information, and may command the electronic storage device 120 to perform charging or discharging, whereby the energy storage device 120 may be charged or discharged in order to relieve the overload of the transmission line.

The congestion control power management system 110 may periodically collect information associated with the voltage, the current, the phase, the temperature, or the like of a transmission line from the transmission line monitoring device 300 through the network matching device 130, so as to calculate power flowing through the transmission line (transmission line power), may determine whether the transmission line power is greater than or equal to a set value which is set to the appropriate amount of power so as to monitor whether the transmission line is overloaded, and may recognize that the transmission line is overloaded when the amount of power that flows is higher than the set value.

When it is recognized that the transmission line is overloaded, the congestion control power management system 110 may calculate the amount of power to be supplied to a load from the energy storage device 120 and perform control such that the energy storage device 120 supplies power, or may calculate the amount of cutback power of a generator associated with the overloaded transmission line to transmit the corresponding information to the EMS 200, thereby relieving the overload of the transmission line, which will be described in detail in the following description.

The energy storage device 120 may be connected with a transmission line, receives power from the transmission line, and stores the power or supplies power to a load. A plurality of energy storage devices 120 may exist, and each energy storage device 120 is connected between a transmission line and the load 400. When a corresponding transmission line to which the energy storage device 200 is connected is overloaded, the energy storage device 120 may supply power to a load associated with the overloaded transmission line to release the overload of the transmission line. A large-capacity energy storage system (ESS) or the like may be used as the energy storage device 120. The plurality of energy storage devices 120 may use various protocols. In this instance, the network matching device 130 may communicate with the energy storage devices 120 which use various protocols so as to collect information, and standardize the collected information.

Figure 3:
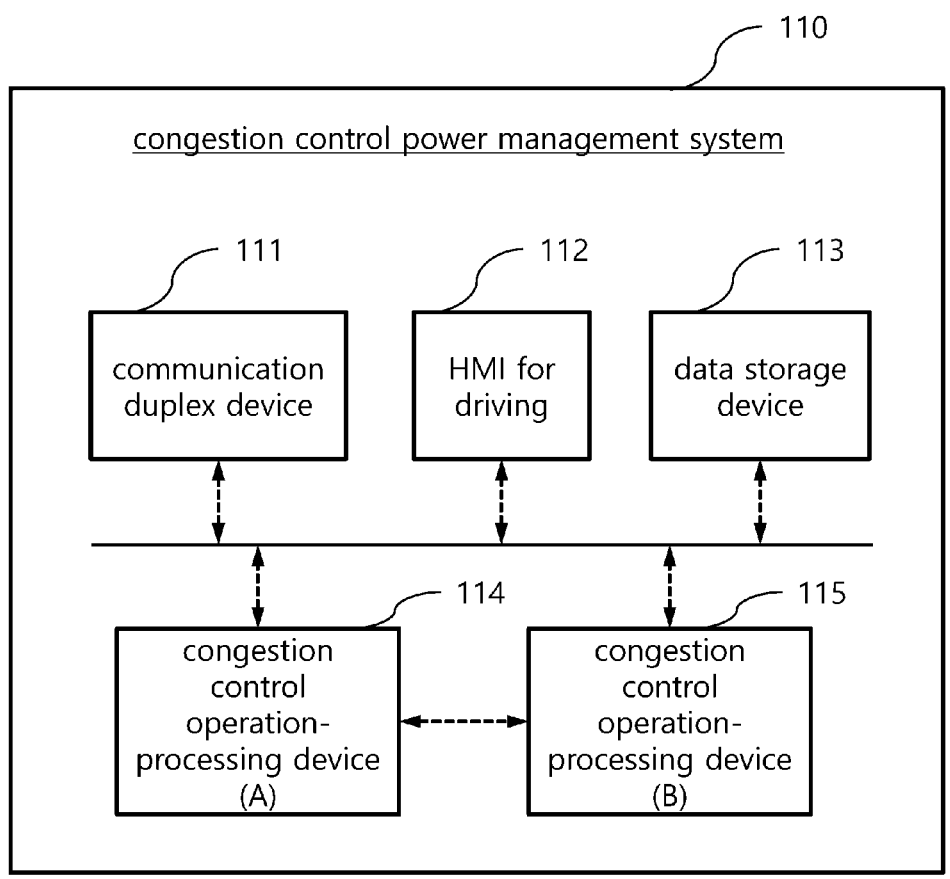
FIG. 3 is a block diagram illustrating the configuration of the congestion control power management system of FIG. 2.

FIG. 3 is a block diagram illustrating the detailed configuration of the congestion control power management system 110 of FIG. 2. Referring to FIG. 3, the congestion control power management system 110 may include a communication duplex device 111, a human-machine interface (HMI) for driving 112, a data storage device 113, one or more congestion control operation-processing devices 114 and 115.

A normal communication unit which is not duplexed may be used as the communication duplex device 111. Preferably, when a parallel redundancy protocol (PRP) is used, stable communication is supported among equipments and the availability of the overall system may be increased. The PRP is a redundancy protocol recommended in International Electrotechnical Commission (IEC) 61850 standard, and is defined in IEC 62439-3 Clause 4. When a network is established using a normal protocol, packet loss may occur due to link disconnection and restoration of the link takes time, ranging from several tens milliseconds (ms) to several tens seconds (s). However, when a duplex network is established using a PRP, communication is normally continued without packet loss attributable to the link disconnection, whereby stability of the system may be improved.

The HMI for driving 112 is an interface between a driver and a device, and performs an interface function required when the driver controls the operations of the congestion control power management system 110.

The data storage device 113 may store various types of data required for operating the congestion control power management system 110. A semi-conductor memory may be used as the data storage device 113.

The congestion control operation-processing devices 114 and 115 may be in charge of a calculating function performed by the congestion control power management system 110. A single congestion control operation-processing device may be used, but preferably, two congestion control operation-processing devices 114 and 115 may be used to secure redundancy and guarantee stable operation in the same manner as a communication duplex device. Microprocessors having a calculating function may be used for the congestion control operation-processing devices 114 and 115.

Figure 4:
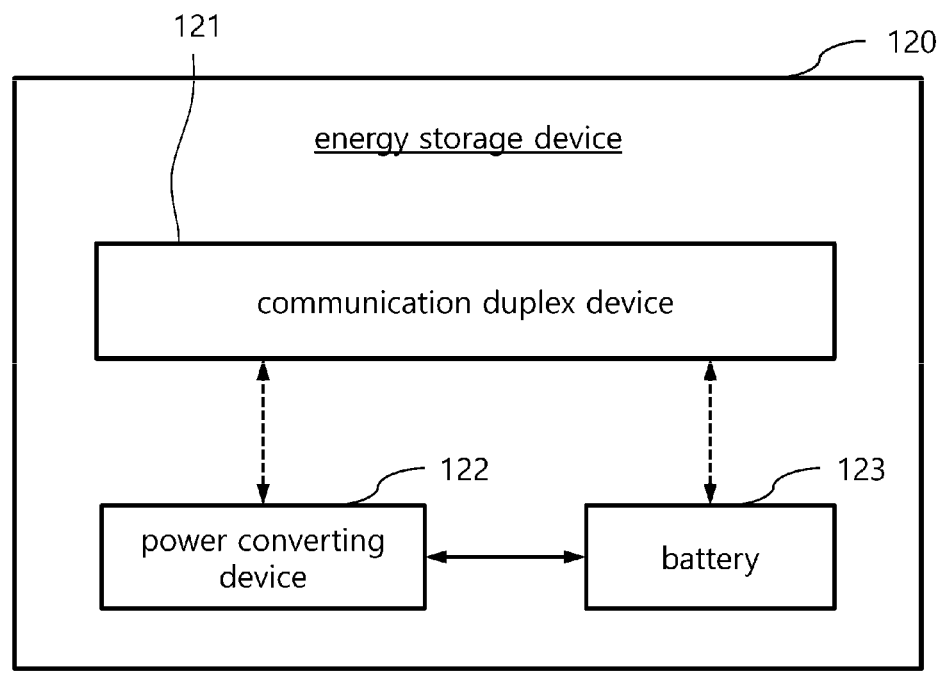
FIG. 4 is a block diagram illustrating the configuration of the energy storage device of FIG. 2.

FIG. 4 is a block diagram illustrating the configuration of the energy storage device 120 of FIG. 2. Referring to FIG. 4, the energy storage device 120 may include a communication duplex device 121, a power converting device 122, and a battery 123.

The communication duplex device 121 may perform a communication function in the same manner as the communication duplex device 111 included in the above-described congestion control power management system 110.

The power converting device 122 may be connected with the battery 123 through a direct current power line, and may supply power to a transmission line upon reception of a command to perform discharging from the congestion control power management system 110 or may receive power from a transmission line and store the same in a battery, upon reception of a command to perform charging. From among various power converters, such as a buck converter, a boost converter, a buck-boost converter, a pull-bridge converter, and the like, a converter may be selectively used as the power converting device 122. It is preferable that the power converting device 122 according to an embodiment of the present invention bi-directionally delivers power. The power converting device 122 and the battery 123 may provide, to the network matching device 130, at least a part of information related to their operation states (e.g., the voltage, current, power, temperature, state of charge (SOC), and the like thereof) through the communication duplex device 121.

Although FIG. 4 illustrates the battery 123 as an energy storage unit, the energy storage unit may not be limited to the battery 123 and other types of energy storage units such as a fuel cell or the like may be also used.

Figure 5:
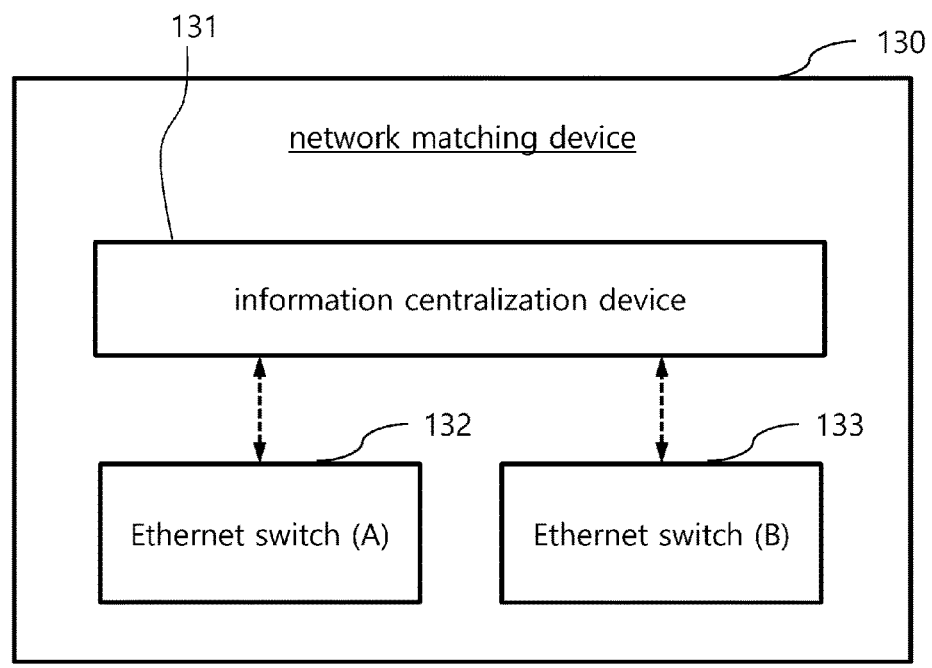
FIG. 5 is a block diagram illustrating the configuration of the network matching device of FIG. 2.

FIG. 5 is a block diagram illustrating the configuration of the network matching device 130 of FIG. 2. The network matching device 130 may include an information centralization device 131, an Ethernet switch A 132, and an Ethernet switch B 133.

The information centralization device 131 may gather information associated with the power converting device 122 and the battery 123 included in the energy storage device 120, convert the information based on the same address space (address map) and a predetermined scale, store the information, and transmit the information to the congestion control power management system. Sometimes, overall system may not be configured with the same equipments. Also, after a system is primarily established, equipment from a different company may be used when the system is secondarily established. In this instance, information addresses and scales of different types of equipments may be different from each other, and thus, they need to be standardized in a unified structure. To this end, the information centralization device 131 may be used. The information centralization device 131 may be implemented by a separate hardware device, or may be embodied in the form of software included in a computer system.

It is preferable that the Ethernet switches 132 and 133 are configured to be duplexed in order to increase the stability and high availability of the overall network by using the above-described PRP. However, this may not be limited thereto, and a normal communication unit, which is not duplexed, may be used.

Figure 6:
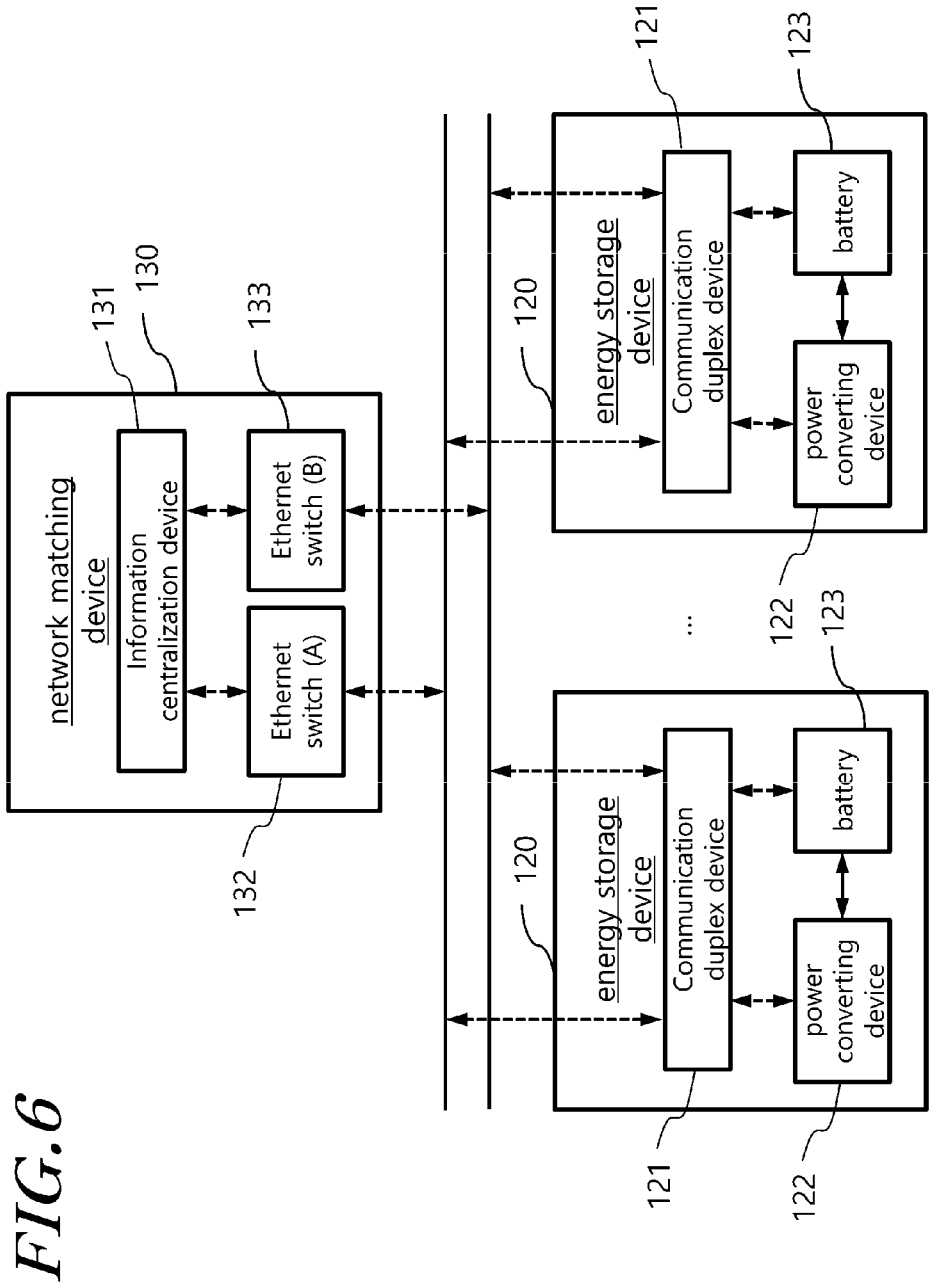
FIG. 6 is a block diagram illustrating the configuration in which an energy storage device and a network matching device are associated with each other.
Figure 7:
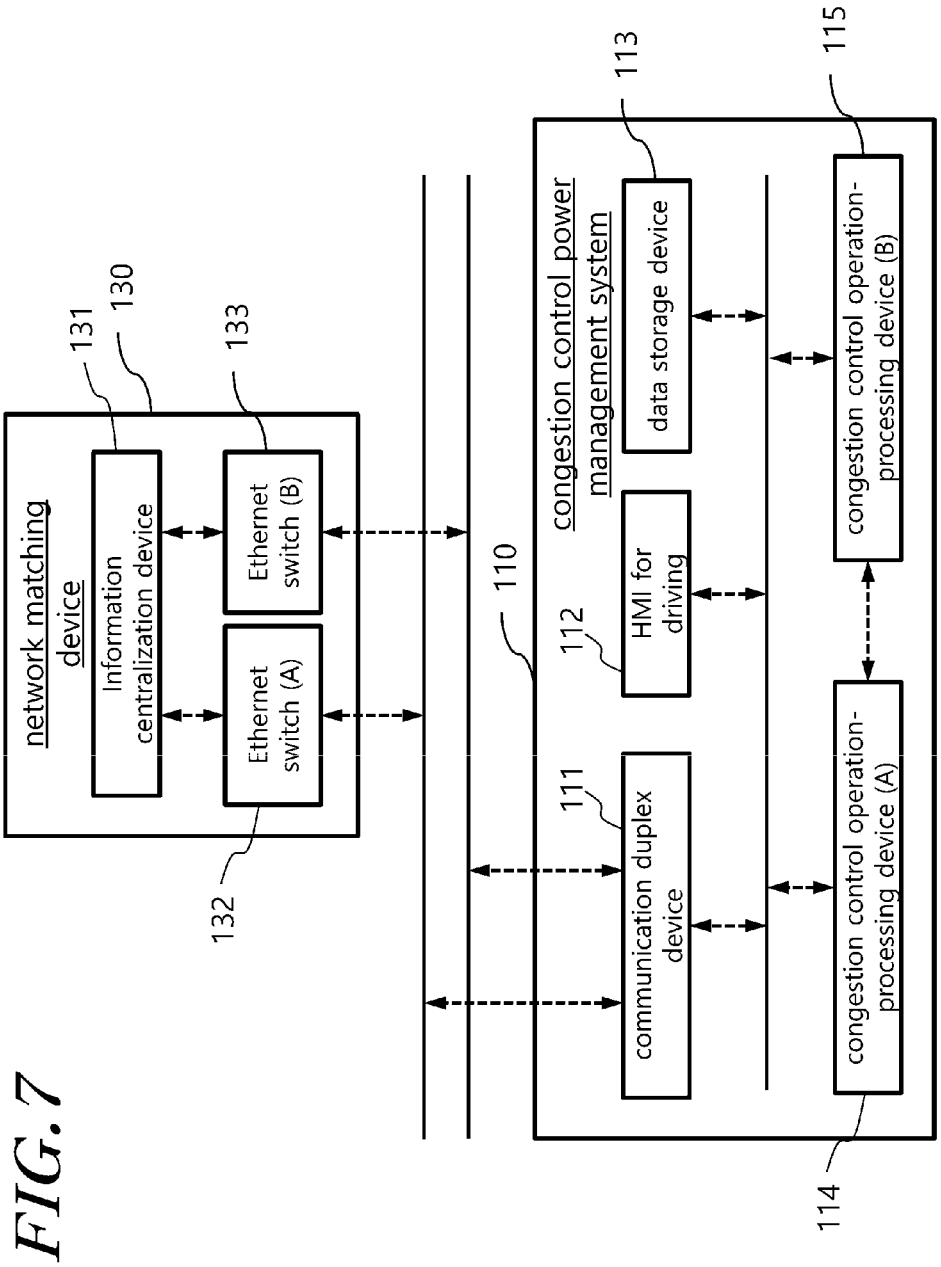
FIG. 7 is a block diagram illustrating the configuration in which a congestion control power management system and a network matching device are associated with each other.

FIG. 6 is a block diagram illustrating the configuration in which the energy storage device 120 and the network matching device 130 are associated with each other. FIG. 7 is a block diagram illustrating the configuration in which the congestion control power management system 110 and the network matching device 130 are associated with each other. Referring to FIGS. 6 and 7, the network matching device 130, the congestion control power management system 110, and the energy storage device 120 may be mutually connected to each other, may transmit and receive information to/from one another through a duplexed communication unit, and may perform the above-described function.

Subsequently, a method of relieving the overload of a transmission line using a power-system management system according to an embodiment of the present invention will be described. According to the present invention, the overload of a transmission line may be relieved through the following three methods. A first method is to supply power stored in an energy storage device to a load that most highly affects an overloaded transmission line. A second method is to reduce power production of a generator associated with an overloaded transmission line. A third method is to use both the first and second methods.

First, the method of supplying power stored in an energy storage device to a load that most highly affects an overloaded transmission line (hereinafter, referred to as 'maximum influential load") will be described. The method is based on a principle in which the amount of power flowing through a transmission line decreases when a load is decreased. When an energy storage device disposed between an overloaded transmission line and a maximum influential load supplies power to the maximum influential load, the amount of power that the maximum influential load receives from the transmission line is decreased, whereby the overload of the transmission line may be relieved.

Figure 8:
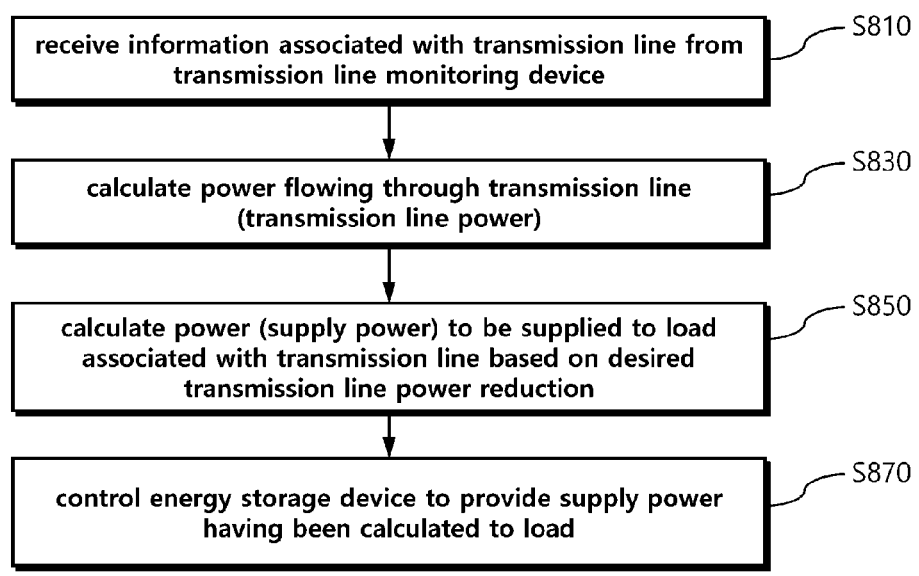
FIG. 8 is a diagram illustrating a procedure of relieving the overload of a transmission line according to a method of supplying power stored in an energy storage device to the overloaded transmission line.

FIG. 8 is a diagram illustrating a procedure of relieving the overload of a transmission line according to a method of supplying power stored in an energy storage device to the overloaded transmission line. Referring to FIG. 8, the congestion control power management system may include: operation S810 in which the congestion control power management system receives information associated with a transmission line from a transmission line monitoring device; operation S830 in which the congestion control power management system calculates power flowing through the transmission line (transmission line power); operation S850 in which the congestion control power management system determines whether the transmission line is overloaded by determining whether transmission line power is greater or equal to a set value, and calculates the amount of power (supply power) to be supplied to the transmission line according to the amount of transmission line power desired to be reduced (a desired transmission line power reduction); and operation S870 in which the congestion control power management system controls an energy storage device to provide the calculated supply power to a maximum influential load.

According to the method of FIG. 8, an energy storage device to be used to supply power and the amount of power to be supplied to a transmission line need to be determined in order to relieve the overload of the transmission line. When an excessively small amount of power is supplied, the overload may not be relieved. When an excessively large amount of power is supplied, unnecessary energy transmission may exist between an energy storage device and a transmission line, and the overall power system may come to be inefficient. Therefore, it is preferable that the amount of power appropriate for relieving the overload needs to be supplied. However, a great number of transmission and distribution lines are tangled between a plurality of generators and a plurality of loads in the power system, and thus, it is difficult to accurately calculate the appropriate amount of power to be supplied from the energy storage device.

In the embodiment of the present invention, a load-transmission line reduction ratio may be defined and used to calculate the appropriate amount of power required to relieve overload. A load that most highly affects an overloaded transmission line (a maximum influential load) may be defined, a reduction ratio between the maximum influential load and transmission line power (load-transmission line reduction ratio) may be calculated in advance or in real time according to Equation 1 provided below, and the amount of supply power to be provided from the energy storage device 120 to the maximum influential load may be calculated using the load-transmission line reduction ratio and a desired transmission line power reduction (the amount of power desired to be reduced in power flowing through the transmission line) according to Equation 2 provided below. The load-transmission line reduction ratio may be analyzed and calculated using commercial software used for designing a power system transmission and distribution network.

$$\text{load-transmission line reduction ratio} = \frac{\text{reduction in transmission line power}}{\text{reduction in maximum influential load}} \quad [\text{Equation 1}]$$

$$\text{supply power} = \frac{\text{desired transmission line power reduction}}{\text{load-transmission line reduction ratio}} \quad [\text{Equation 2}]$$

According to the method of using the load-transmission line reduction ratio, variation in power of a transmission line, which is attributable to changing of a load, may be quantitatively reflected, and the amount of power required to relieve the overload of the transmission line may be more accurately calculated.

In the method of using the load-transmission line reduction ratio, when the desired transmission line power reduction is set to be equal to excessive power (the difference between the overloaded transmission line power and a set value which is set in advance as the appropriate amount of power), the appropriate amount of power required for relieving the overload of the transmission line may be supplied. This may be preferable.

In the method of using the load-transmission line reduction ratio, when a CMS is connected with a transmission line by being close to a load, the CMS may effectively act when the corresponding transmission line is overloaded due to a rapid increase in the adjacent load. This may be preferable.

According to the method of using the load-transmission line reduction ratio, an energy storage device supplies power to relieve the overload of an overloaded transmission line, and thus, it is preferable to reduce generated power of a generator associated with the corresponding transmission line by the amount of power supplied by the energy storage device, from the perspective of electric demand and supply. To this end, the CMS provides, to an EMS, information associated with the amount of power supplied to the transmission line, and the EMS may control the power production of generators associated with the corresponding transmission line.

Second, the method of relieving the overload of a transmission line in a manner of reducing the power production of a generator associated with the overloaded transmission line will be described. The method is based on a principle in which power flowing through an associated transmission line is decreased when the power production of a generator is decreased. When the power production of a generator that most highly affects an overloaded transmission line is reduced, power that flows through the overloaded transmission line may be reduced efficiently. According to the method, the amount of power generated by the generator that most highly affects the overloaded transmission line is reduced. An EMS may increase the amount of power generated by other generators to maintain the balance of electric demand and supply of the overall power system, or may act in response to a situation using a load shedding method, a demand response method, and the like.

Figure 9:
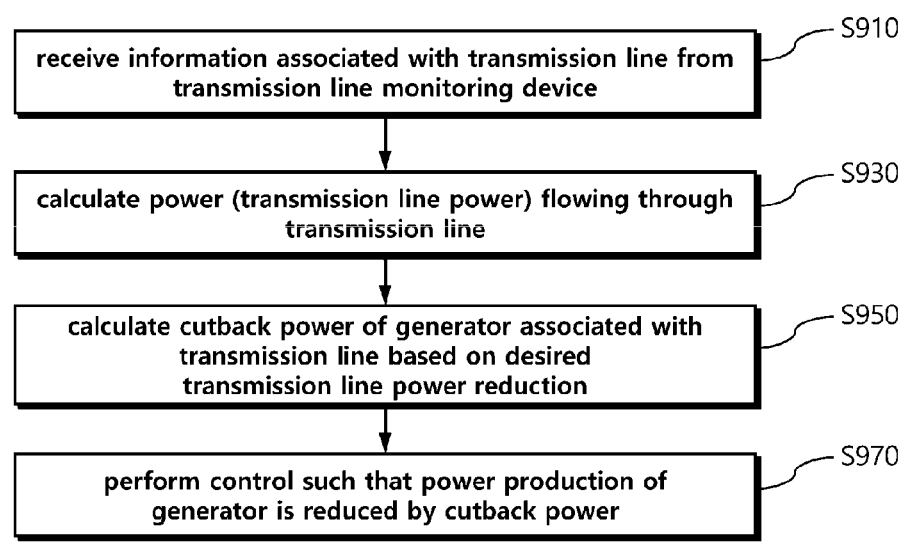
FIG. 9 is a diagram illustrating a procedure of relieving the overload of a transmission line in a manner of reducing the amount of power produced by a generator associated with the overloaded transmission line.

FIG. 9 is a diagram illustrating a procedure of relieving the overload of a transmission line in a manner of reducing the amount of power produced by a generator associated with an overloaded transmission line. Referring to FIG. 9, the procedure may include: operation S910 in which a CMS receives information associated with a transmission line from a transmission line monitoring device; operation S930 in which the CMS calculates power flowing through the transmission line (transmission line power); operation S950 in which the CMS determines that the transmission line is overloaded when the transmission line power is greater than or equal to a set value, calculates the amount of transmission line power desired to be reduced (a desired transmission line power reduction A), and calculates the amount of cutback power (the amount of generated power desired to be reduced) of a generator associated with the transmission line based on the desired transmission line power reduction A; and operation S970 in which an EMS performs control such that the amount of power produced by the generator is reduced by the amount of cutback power. Although it is described that the CMS performs operation S950 in the above description, operation S950 may be performed by the EMS. When the CMS system performs the third operations, the CMS may transmit information associated with the amount of cutback power having been calculated, to the EMS.

According to the method of FIG. 9, in order to relieve the overload of the transmission line, a generator that needs to reduce power production and the amount of power production that the generator needs to reduce to appropriately relieve the overload of the transmission line need to be determined When the amount of cutback power of the generator is excessively small, the overload may not be relieved. When the amount of cutback power is excessively large, the imbalance of energy demand and supply and inefficiency may occur in the overall power system. Therefore, the amount of power appropriate for relieving the overload needs to be cut back. However, as described above, since many transmission and distribution lines are tangled between a plurality of generators and a plurality of loads in the power system, it is difficult to accurately calculate the appropriate amount of cutback power.

In the embodiment of the present invention, a generator-transmission line reduction ratio may be used to calculate the appropriate amount of cutback power to relieve overload. A generator that most highly affects an overloaded transmission line (a maximum influential generator) may be defined, a generator-transmission line reduction ratio between the maximum influential generator and the overloaded transmission line may be calculated according to Equation 3 provided below, and the amount of cutback power may be calculated using the generator-transmission line reduction ratio and the desired transmission line power reduction A according to Equation 4 provided below. Subsequently, control is performed such that the maximum influential generator reduces power production by the calculated cutback power. The generator-transmission line reduction ratio may be analyzed and calculated using commercial software used for designing a power system transmission and distribution network.

$$\text{generator-transmission line reduction ratio} = \frac{\text{reduction in transmission line power}}{\text{reduction in generator's generated power}} \quad \text{[Equation 3]}$$

$$\text{cutback power} = \frac{\text{desired transmission line power reduction } A}{\text{generator-transmission line reduction ratio}} \quad \text{[Equation 4]}$$

According to the method of using the generator-transmission line reduction ratio, variation in transmission line power, which is attributable to changing of the amount of power produced by a generator, may be quantitatively reflected, and the amount of cutback power required to relieve the overload of a transmission line may be more accurately calculated.

When the desired transmission line power reduction A is equal to the difference (excess power) between the power of the overloaded transmission line and the set value, the generator may reduce the amount of power appropriate for relieving the overload of the transmission line. This is preferable.

Third, the method of using both the method of supplying power stored in an energy storage device to a load associated with an overloaded transmission line and the method of reducing the amount of power produced by a generator associated with the overloaded transmission line, will be described.

The method sets a desired transmission line power reduction A which corresponds to the amount of power desired to be reduced by cutback by a generator and sets a desired transmission line power reduction B which corresponds to the amount of power desired to be reduced by supplying power from an energy storage device to a load associated with a transmission line, by taking into consideration the difference (excess power) between transmission line power of an overloaded transmission line and a predetermined appropriate power set value, calculates cutback power and supply power according to above-described Equations 1 to 4, and reduces the amount of power produced by the generator by the amount of cutback power having been calculated and, simultaneously, supplies power corresponding to the amount of supply power, which has been calculated, from the energy storage device to the load associated with the transmission line. In the method, when the sum of the desired transmission line power reduction A and the desired transmission line power reduction B is equal to the excess power, the transmission line power may be close to the appropriate power set value. Therefore, it is preferable.

Figure 10:
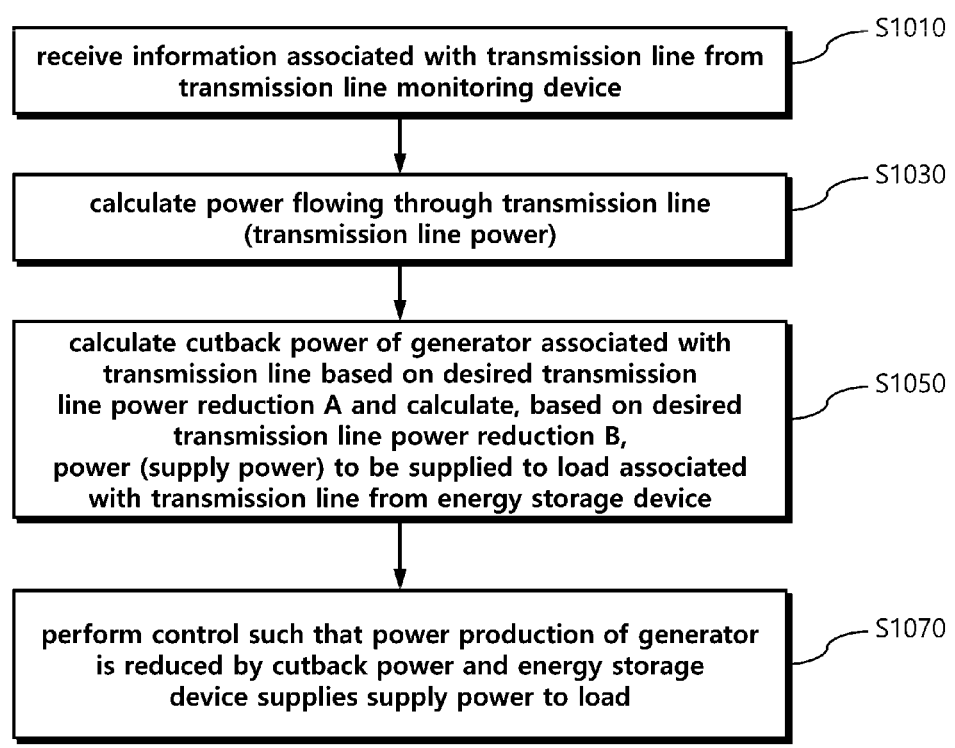
FIG. 10 is a diagram illustrating a procedure of relieving the overload of a transmission line using both the methods of FIG. 8 and FIG. 9.

FIG. 10 is a diagram illustrating a procedure of relieving the overload of a transmission line using both the methods of FIG. 8 and FIG. 9. Referring to FIG. 10, the procedure may include: operation S1010 in which a CMS receives information associated with a transmission line from a transmission line monitoring device; operation S1030 in which the CMS calculates power flowing through the transmission line (transmission line power); operation S1050 in which the CMS determines that transmission line is overloaded when the transmission line power is greater than or equal to a set value, calculates a desired transmission line power reduction A corresponding to the amount of power desired to be reduced by the reduction by a generator, calculates a desired transmission line power reduction B corresponding to the amount of power desired to be reduced by supplying power from an energy storage device to a load associated with the overloaded transmission line, calculates the amount of cutback power of the generator associated with the transmission line based on the transmission line power reduction A according to Equations 3 and 4, and calculates the amount of power to be supplied (supply power) from the energy storage device to the load associated with the transmission line based on the desired transmission line power reduction B according to Equations 1 and 2; and operation S1070 in which the CMS controls the energy storage device to the supply power, which has been calculated, to the transmission line, and provides information associated with cutback power, which has been calculated, to the EMS, whereby the EMS performs control such that the amount of power produced by the generator is reduced by the amount of cutback power.

According to the method of FIG. 10, by using both the generator-transmission line reduction ratio and the load-transmission line reduction ratio, reduction in transmission line power attributable to decrease in load, and variation in transmission line power attributable to changing of the amount of power produced by the generator are quantitatively reflected. Accordingly, the amount of cutback power and the amount of power to be supplied from an energy supply device to the transmission line, which are required to relieve the overload of the transmission line can be more accurately calculated. Also, the desired transmission line power reduction A and the desired transmission line power reduction B may be appropriately controlled by taking into consideration of energy remaining in the energy supply device, whereby the overload can be effectively relieved.

Although the present invention has been described with reference to the accompanying drawings, these are provided for illustrative purposes, and those skilled in the art would appreciate that various modifications and other equivalent embodiments are possible. Therefore, the scope of the protection of the technology should be determined by only the attached claims.

What is claimed is:

1. A congestion management system, comprising:
an energy storage device connected with a transmission line, and configured to receive power from the transmission line to store the power, or to supply power to a load associated with the transmission line; and
a congestion control power management system configured to: receive information associated with the transmission line from a transmission line monitoring device so as to calculate transmission line power flowing through the transmission line; determine that the transmission line power is overloaded when the transmission line power is greater than or equal to a set value; and control the energy storage device to provide supply power to the load, wherein the supply power is power calculated based on a desired transmission line power reduction corresponding to an amount less than the set value;
wherein the supply power that is to be supplied to the load from the energy storage device based on the desired transmission line power reduction is calculated by:
defining a maximum influential load affecting the overload;
determining a reduction in maximum influential load among a plurality of loads;
determining a reduction in the transmission line power;
calculating a load-transmission line reduction ratio, which is a reduction ratio between the reduction in maximum influential load and the reduction in transmission line power according to Equation 1 provided below; and
calculating the supply power using the load-transmission line reduction ratio and the desired transmission line power reduction according to Equation 2 provided below;
wherein the Equation 1 is:

$$\text{load-transmission line reduction ratio} = \frac{\text{reduction in transmission line power}}{\text{reduction in maximum influential load}}$$

wherein the Equation 2 is:

$$\text{supply power} = \frac{\text{desired transmission line power reduction}}{\text{load-transmission line reduction ratio}}$$

wherein the energy storage device includes a plurality of energy storage devices using protocols; and
the congestion management system further includes a network matching device which communicates with a plurality of energy storage devices using protocols, and standardizes information collected from the plurality of energy storage devices.

2. The congestion management system of claim 1, wherein the network matching device communicates with the congestion control power management system and the energy storage device based on a parallel redundancy protocol (PRP) scheme.

3. The congestion management system of claim 2, wherein the network matching device gathers the information collected from the plurality of energy storage devices, and converts the information based on an address map and a predetermined scale.

4. The congestion management system of claim 3, wherein the congestion control power management system comprises:
- a communication duplex device configured to communicate with the network matching device;
- a data storage device configured to store data; and
- a congestion control operation-processing device configured to calculate the transmission line power and the supply power.

5. The congestion management system of claim 3, wherein the energy storage device comprises:
- a communication duplex device configured to communicate with the network matching device;
- a battery configured to store energy; and
- a power converting device configured to convert and transmit energy between the transmission line and the battery.

* * * * *